United States Patent
Cheng et al.

(10) Patent No.: US 10,470,166 B2
(45) Date of Patent: Nov. 5, 2019

(54) HYBRID AUTOMATIC REPEAT REQUEST-ACKNOWLEDGMENT TRANSMISSION METHOD AND APPARATUS

(71) Applicant: Huawei Technologies Co., Ltd., Shenzhen (CN)

(72) Inventors: Yan Cheng, Beijing (CN); Yongxing Zhou, Beijing (CN); Bingyu Qu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 24 days.

(21) Appl. No.: 15/694,606

(22) Filed: Sep. 1, 2017

(65) Prior Publication Data

US 2017/0367084 A1 Dec. 21, 2017

Related U.S. Application Data

(63) Continuation of application No. PCT/CN2015/073636, filed on Mar. 4, 2015.

(51) Int. Cl.
*H04W 72/04* (2009.01)
*H04W 28/04* (2009.01)
*H04L 1/18* (2006.01)

(52) U.S. Cl.
CPC ....... *H04W 72/0406* (2013.01); *H04L 1/1854* (2013.01); *H04L 1/1861* (2013.01); *H04W 28/04* (2013.01); *H04W 72/04* (2013.01); *H04L 1/1812* (2013.01)

(58) Field of Classification Search
CPC ................................................ H04W 72/0406
See application file for complete search history.

(56) References Cited

U.S. PATENT DOCUMENTS

| | | | |
|---|---|---|---|
| 2014/0112218 A1 | 4/2014 | Li | |
| 2014/0293893 A1 | 10/2014 | Papasakellariou et al. | |
| 2015/0092628 A1 | 4/2015 | Zhao et al. | |
| 2016/0173236 A1 | 6/2016 | Cheng et al. | |
| 2016/0277169 A1* | 9/2016 | Park | H04L 1/1854 |

FOREIGN PATENT DOCUMENTS

| | | |
|---|---|---|
| CN | 102215096 A | 10/2011 |
| CN | 102820960 A | 12/2012 |
| CN | 103378957 A | 10/2013 |
| CN | 103384189 A | 11/2013 |
| CN | 103516487 A | 1/2014 |
| KR | 20150018016 A | 2/2015 |
| WO | 2015018084 A1 | 2/2015 |
| WO | 2015024248 A1 | 2/2015 |

* cited by examiner

*Primary Examiner* — John D Blanton
(74) *Attorney, Agent, or Firm* — Slater Matsil, LLP

(57) ABSTRACT

Embodiments of the present invention provide a hybrid automatic repeat request-acknowledgment transmission method and an apparatus. The hybrid automatic repeat request-acknowledgment transmission method includes: receiving, by user equipment, on a first serving cell in a subframe n-k, a PDSCH or a downlink control channel indicating downlink SPS release; and sending, by the user equipment in a subframe n, an HARQ-ACK corresponding to the PDSCH or the downlink control channel that is of the first serving cell and that is in the subframe n-k, where an HARQ-ACK timing includes a first HARQ-ACK timing or a second HARQ-ACK timing.

16 Claims, 6 Drawing Sheets

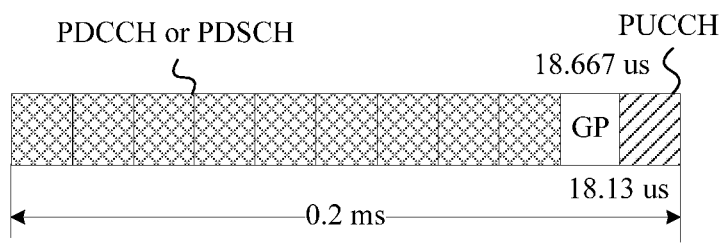

FIG. 4

```
User equipment receives, on a first serving cell in a subframe n-k, a
PDSCH or a downlink control channel indicating downlink SPS
release, where the first serving cell is a serving cell corresponding to     S501
                        the user equipment
```

```
     The user equipment sends, in a subframe n, an HARQ-ACK
corresponding to the PDSCH or the downlink control channel that is of
    the first serving cell and that is in the subframe n-k, where n is an
        integer, k is a positive integer, k belongs to a set K, the set K is
        determined according to a configured HARQ-ACK timing, and the      S502
 configured HARQ-ACK timing includes a first HARQ-ACK timing or
                         a second HARQ-ACK timing
```

FIG. 5

HYBRID AUTOMATIC REPEAT REQUEST-ACKNOWLEDGMENT TRANSMISSION METHOD AND APPARATUS

CROSS-REFERENCE TO RELATED APPLICATIONS

This application is a continuation of International Application No. PCT/CN2015/073636, filed on Mar. 4, 2015, the disclosure of which is hereby incorporated by reference in its entirety.

TECHNICAL FIELD

Embodiments of the present invention relate to the field of wireless communications technologies, and in particular, to a hybrid automatic repeat request-acknowledgment transmission method and an apparatus.

BACKGROUND

A hybrid automatic repeat request (HARQ) is a technology formed by combining forward error correction (FEC) code and an automatic repeat request (Automatic Repeat Request, ARQ). In a Long Term Evolution (LTE) system, to support an HARQ, a terminal needs to feed back an HARQ-acknowledgment (HARQ-ACK) to a base station by using a physical uplink control channel (PUCCH) and a physical uplink shared channel, PUSCH). The HARQ-ACK includes an acknowledgment (ACK) and a negative acknowledgment (NACK).

An existing LTE system includes two types of radio frame structures. A frame structure type 1 is applied to frequency division duplex (FDD), and a frame structure type 2 is applied to time division duplex (TDD). The frame structure type 1 is shown in FIG. 1, and the frame structure type 2 is shown in FIG. 2. FIG. 1 is a schematic structural diagram of a frame structure type 1 in an existing LTE system. FIG. 2 is a schematic structural diagram of a frame structure type 2 in an existing LTE system. In the frame structure type 2 shown in FIG. 2, DwPTS is a downlink pilot timeslot (DwPTS), UpPTS is an uplink pilot timeslot (UpPTS), and GP is a guard period (GP). For both the frame structure type 1 and the frame structure type 2, each radio frame includes 10 subframes, and a length of each subframe (Subframe) is 1 millisecond (ms). For the TDD, seven types of uplink-downlink configurations exist in the existing LTE system, as shown in Table 1.

In Table 1, D is a downlink subframe, U is an uplink subframe, and S is a special subframe.

In the existing LTE system, for the FDD, an HARQ-ACK corresponding to a physical downlink shared channel (PDSCH) transmitted in a downlink subframe n-4 is fed back in an uplink subframe n. For the TDD, an HARQ-ACK corresponding to a PDSCH transmitted in a downlink subframe n-k is fed back in an uplink subframe n, where k belongs to a set K. In a case of all TDD uplink-downlink configurations, a set corresponding to K is shown in Table 2.

TABLE 1

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an evolved LTE system in the future, to reduce a service delay, a length of each subframe is shortened, for example, a length of each subframe is shortened to 0.2 ms, and a new subframe type 1 and a new subframe type 2 are introduced. For example, FIG. 3 is a schematic structural diagram of a new subframe type 1 in which a length of each subframe is 0.2 ms. FIG. 4 is a schematic structural diagram of a new subframe type 2 in which a length of each subframe is 0.2 ms. A subframe that is shortened in terms of time may be referred to as a short subframe or an ultra-short subframe, or may be referred to as a short transmission time interval (TTI) or an ultra-short TTI. When a length of the short subframe is 0.2 ms, a short subframe may include 11 symbols (which may be single carrier frequency division multiple access (SC-FDMA) symbols) in a time domain. For example, as shown in FIG. 3, for the new subframe type 1, the first nine symbols are used for downlink transmission, one symbol is used for a guard period (GP), and one symbol is used for uplink transmission. For example, as shown in FIG. 4, for the new subframe type 2, the first symbol is used for downlink transmission, one symbol is used for a GP, and the remaining nine symbols are used for uplink transmission.

When a frame structure based on a short subframe is used, how to feed back an HARQ-ACK needs to be designed again, so that when a new subframe structure is used, a system can provide a service having a low service delay requirement, and large enough coverage of the new subframe structure can be ensured.

SUMMARY

Embodiments of the present invention provide a hybrid automatic repeat request-acknowledgment transmission method and an apparatus for HARQ-ACK feedback, so that a system can provide a service having a low service delay requirement, and large enough coverage of a new subframe structure can be ensured.

According to a first aspect, a hybrid automatic repeat request-acknowledgment transmission method is provided. The method includes receiving, by user equipment, on a first serving cell in a subframe n-k, a PDSCH or a downlink control channel indicating downlink SPS release, where the first serving cell is a serving cell of the user equipment. The method also includes sending, by the user equipment in a subframe n, an HARQ-ACK corresponding to the PDSCH or the downlink control channel that is of the first serving cell and that is in the subframe n-k, where n is an integer, k is a positive integer, k belongs to a set K, the set K is determined according to a configured HARQ-ACK timing, and the configured HARQ-ACK timing includes a first HARQ-ACK timing or a second HARQ-ACK timing.

With reference to the first aspect, in a first possible implementation manner of the first aspect, when the configured HARQ-ACK timing is the first HARQ-ACK timing, the set K includes only one element, and the subframe n is a first subframe, a second subframe, or an uplink subframe; or when the configured HARQ-ACK timing is the second HARQ-ACK timing, the set K includes at least one element, and the subframe n is a second subframe or an uplink subframe.

With reference to the first possible implementation manner of the first aspect, in a second possible implementation manner of the first aspect, the set K is $\{3\}$ or $\{4\}$ when the configured HARQ-ACK timing is the first HARQ-ACK timing.

With reference to the first aspect or the first possible implementation manner of the first aspect, in a third possible implementation manner of the first aspect, the set K is determined according to a reference uplink-downlink configuration of the first serving cell when the configured HARQ-ACK timing is the second HARQ-ACK timing.

With reference to the third possible implementation manner of the first aspect, in a fourth possible implementation manner of the first aspect, that the set K is determined according to a reference uplink-downlink configuration of the first serving cell when the configured HARQ-ACK timing is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is $\{6\}$, or when the subframe n corresponds to a subframe 4 or a subframe 9 in a radio frame, the set K is $\{4\}$; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is $\{7, 6\}$, or when the subframe n corresponds to a subframe 3 or a subframe 8 in a radio frame, the set K is $\{4\}$; when the reference uplink-downlink configuration is an uplink-downlink configuration 2, the subframe n corresponds to a subframe 2 or a subframe 7 in a radio frame, and the set K is $\{8, 7, 4, 6\}$; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is $\{7, 6, 11\}$, when the subframe n corresponds to a subframe 3 in a radio frame, the set K is $\{6, 5\}$, or when the subframe n corresponds to a subframe 4 in a radio frame, the set K is $\{5, 4\}$; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is $\{12, 8, 7, 11\}$, or when the subframe n corresponds to a subframe 3 in a radio frame, the set K is $\{6, 5, 4, 7\}$; when the reference uplink-downlink configuration is an uplink-downlink configuration 5, the subframe n corresponds to a subframe 2 in a radio frame, and the set K is $\{13, 12, 9, 8, 7, 5, 4, 11, 6\}$; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is $\{7\}$, or when the subframe n corresponds to a subframe 4 in a radio frame, the set K is $\{5\}$.

With reference to the third or the fourth possible implementation manner of the first aspect, in a fifth possible implementation manner of the first aspect, the reference uplink-downlink configuration is an uplink-downlink configuration of the first serving cell, and the uplink-downlink configuration of the first serving cell indicates distribution of a first subframe, a second subframe, a downlink subframe, and an uplink subframe in a radio frame.

According to a second aspect, a hybrid automatic repeat request-acknowledgment transmission method is provided. The method includes configuring, by a base station, an HARQ-ACK timing for user equipment, where the HARQ-ACK timing configured by the base station for the user equipment includes a first HARQ-ACK timing or a second HARQ-ACK timing. The method also includes sending, by the base station to the user equipment, on a first serving cell in a subframe n-k, a PDSCH or a downlink control channel indicating downlink SPS release, where the first serving cell is a serving cell of the user equipment. The method also includes receiving, by the base station in a subframe n, an HARQ-ACK that is sent by the user equipment and that corresponds to the PDSCH or the downlink control channel that is of the first serving cell and that is in the subframe n-k, where n is an integer, k is a positive integer, k belongs to a set K, and the set K is determined according to the HARQ-ACK timing configured by the base station for the user equipment.

With reference to the second aspect, in a first possible implementation manner of the second aspect, when the HARQ-ACK timing configured by the base station for the user equipment is the first HARQ-ACK timing, the set K includes only one element, and the subframe n is a first subframe, a second subframe, or an uplink subframe; or when the HARQ-ACK timing configured by the base station for the user equipment is the second HARQ-ACK timing, the set K includes at least one element, and the subframe n is a second subframe or an uplink subframe.

With reference to the first possible implementation manner of the second aspect, in a second possible implementation manner of the second aspect, the set K is {3} or {4} when the HARQ-ACK timing configured by the base station for the user equipment is the first HARQ-ACK timing.

With reference to the second aspect or the first possible implementation manner of the second aspect, in a third possible implementation manner of the second aspect, the set K is determined according to a reference uplink-downlink configuration of the first serving cell when the HARQ-ACK timing configured by the base station for the user equipment is the second HARQ-ACK timing.

With reference to the third possible implementation manner of the second aspect, in a fourth possible implementation manner of the second aspect, that the set K is determined according to a reference uplink-downlink configuration of the first serving cell when the HARQ-ACK timing configured by the base station for the user equipment is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is an uplink-downlink configuration 2, the subframe n corresponds to a subframe 2 or a subframe 7 in a radio frame, and the set K is {8, 7, 4, 6}; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

With reference to the third or the fourth possible implementation manner of the second aspect, in a fifth possible implementation manner of the second aspect, the reference uplink-downlink configuration is an uplink-downlink configuration of the first serving cell, and the uplink-downlink configuration of the first serving cell indicates distribution of a first subframe, a second subframe, a downlink subframe, and an uplink subframe in a radio frame.

With reference to any one of the second aspect or the first to the fifth possible implementation manners of the second aspect, in a sixth possible implementation manner of the second aspect, the configuring, by a base station, an HARQ-ACK timing for user equipment includes: configuring, by the base station, the reference uplink-downlink configuration of the first serving cell for the user equipment, where the reference uplink-downlink configuration of the first serving cell determines an HARQ-ACK timing of the first serving cell.

According to a third aspect, user equipment (UE) is provided. The UE includes a receiving module, configured to receive, on a first serving cell in a subframe n-k, a PDSCH or a downlink control channel indicating downlink SPS release, where the first serving cell is a serving cell of the user equipment. The UE also includes a sending module, configured to send, in a subframe n, an HARQ-ACK corresponding to the PDSCH or the downlink control channel that is of the first serving cell and that is in the subframe n-k, where n is an integer, k is a positive integer, k belongs to a set K, the set K is determined according to a configured HARQ-ACK timing, and the configured HARQ-ACK timing includes a first HARQ-ACK timing or a second HARQ-ACK timing.

With reference to the third aspect, in a first possible implementation manner of the third aspect, when the configured HARQ-ACK timing is the first HARQ-ACK timing, the set K includes only one element, and the subframe n is a first subframe, a second subframe, or an uplink subframe; or when the configured HARQ-ACK timing is the second HARQ-ACK timing, the set K includes at least one element, and the subframe n is a second subframe or an uplink subframe.

With reference to the first possible implementation manner of the third aspect, in a second possible implementation manner of the third aspect, the set K is {3} or {4} when the configured HARQ-ACK timing is the first HARQ-ACK timing.

With reference to the third aspect or the first possible implementation manner of the third aspect, in a third possible implementation manner of the third aspect, the set K is determined according to a reference uplink-downlink configuration of the first serving cell when the configured HARQ-ACK timing is the second HARQ-ACK timing.

With reference to the third possible implementation manner of the third aspect, in a fourth possible implementation manner of the third aspect, that the set K is determined according to a reference uplink-downlink configuration of the first serving cell when the configured HARQ-ACK timing is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is an uplink-downlink configuration 2, the subframe n corresponds to a subframe 2 or a subframe 7 in a radio frame, and the set K is {8, 7, 4, 6}; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

With reference to the third or the fourth possible implementation manner of the third aspect, in a fifth possible implementation manner of the third aspect, the reference uplink-downlink configuration is an uplink-downlink configuration of the first serving cell, and the uplink-downlink configuration of the first serving cell indicates distribution of a first subframe, a second subframe, a downlink subframe, and an uplink subframe in a radio frame.

According to a fourth aspect, a base station is provided. The base station includes a processing module, configured to configure an HARQ-ACK timing for user equipment, where the HARQ-ACK timing configured by the processing module for the user equipment includes a first HARQ-ACK timing or a second HARQ-ACK timing. The base station also includes a sending module, configured to send, to the user equipment, on a first serving cell in a subframe n-k, a PDSCH or a downlink control channel indicating downlink SPS release, where the first serving cell is a serving cell of the user equipment. The base station also includes a receiving module, configured to receive, in a subframe n, an HARQ-ACK that is sent by the user equipment and that corresponds to the PDSCH or the downlink control channel that is of the first serving cell and that is in the subframe n-k, where n is an integer, k is a positive integer, k belongs to a set K, and the set K is determined according to the HARQ-ACK timing configured by the processing module for the user equipment.

With reference to the fourth aspect, in a first possible implementation manner of the fourth aspect, when the HARQ-ACK timing configured by the processing module for the user equipment is the first HARQ-ACK timing, the set K includes only one element, and the subframe n is a first subframe, a second subframe, or an uplink subframe; or when the HARQ-ACK timing configured by the processing module for the user equipment is the second HARQ-ACK timing, the set K includes at least one element, and the subframe n is a second subframe or an uplink subframe.

With reference to the first possible implementation manner of the fourth aspect, in a second possible implementation manner of the fourth aspect, the set K is {3} or {4} when the HARQ-ACK timing configured by the processing module for the user equipment is the first HARQ-ACK timing.

With reference to the fourth aspect or the first possible implementation manner of the fourth aspect, in a third possible implementation manner of the fourth aspect, the set K is determined according to a reference uplink-downlink configuration of the first serving cell when the HARQ-ACK timing configured by the processing module for the user equipment is the second HARQ-ACK timing.

With reference to the third possible implementation manner of the fourth aspect, in a fourth possible implementation manner of the fourth aspect, that the set K is determined according to a reference uplink-downlink configuration of the first serving cell when the HARQ-ACK timing configured by the processing module for the user equipment is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is an uplink-downlink configuration 2, the subframe n corresponds to a subframe 2 or a subframe 7 in a radio frame, and the set K is {8, 7, 4, 6}; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

With reference to the third or the fourth possible implementation manner of the fourth aspect, in a fifth possible implementation manner of the fourth aspect, the reference uplink-downlink configuration is an uplink-downlink configuration of the first serving cell, and the uplink-downlink configuration of the first serving cell indicates distribution of a first subframe, a second subframe, a downlink subframe, and an uplink subframe in a radio frame.

With reference to any one of the fourth aspect or the first to the fifth possible implementation manners of the fourth aspect, in a sixth possible implementation manner of the fourth aspect, the configuring, by a base station, an HARQ-ACK timing for user equipment includes: the processing module is specifically configured to configure the reference uplink-downlink configuration of the first serving cell for the user equipment, where the reference uplink-downlink configuration of the first serving cell determines an HARQ-ACK timing of the first serving cell.

According to the hybrid automatic repeat request-acknowledgment transmission method and the apparatus that are provided in the embodiments of the present invention, an HARQ-ACK timing is configured by using a higher layer, and a first HARQ-ACK timing and a second HARQ-ACK timing are provided. For a cell center user, the first HARQ-ACK timing may be configured, so that a delay is reduced and a system can provide a low-delay service. For a cell edge user, the second HARQ-ACK timing may be configured, so that HARQ-ACK performance is ensured, that is, coverage of the system is ensured. Therefore, when a short subframe structure is used, the system can provide a service having a low service delay requirement, and large enough coverage of a new subframe structure can be ensured.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 4 is a schematic structural diagram of a new subframe type 2;

FIG. 5 is a flowchart of Embodiment 1 of a hybrid automatic repeat request-acknowledgment transmission method according to an embodiment of the present invention;

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
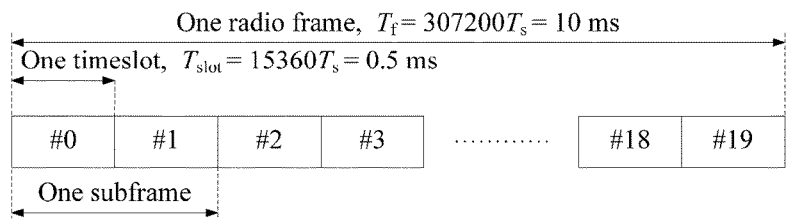
FIG. 1 is a schematic structural diagram of a frame structure type 1 in an existing LTE system.
Figure 2:
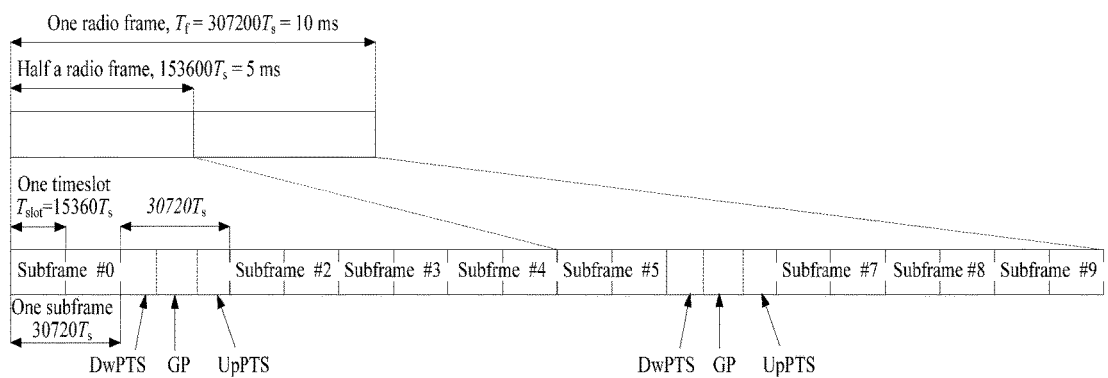
FIG. 2 is a schematic structural diagram of a frame structure type 2 in an existing LTE system.
Figure 3:
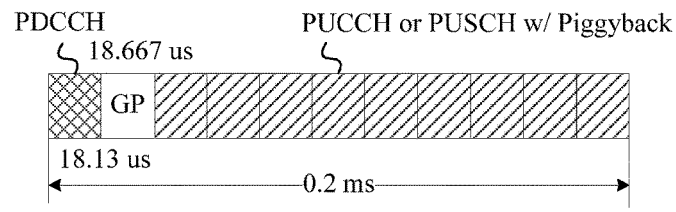
FIG. 3 is a schematic structural diagram of a new subframe type 1.

In an evolved LTE system in the future, to reduce a service delay, a frame structure based on a short subframe is introduced. In the frame structure based on the short subframe, a length of each subframe is shortened, and a new subframe type 1 and a new subframe type 2 are introduced. For example, when the length of each subframe is shortened to 0.2 ms, a schematic structural diagram of the new subframe type 1 is shown in FIG. 3, and a schematic structural diagram of the new subframe type 2 is shown in FIG. 4. It should be noted that a length of each shortened subframe is not limited in the present invention. For example, the length of each subframe may be alternatively shortened to 0.25 ms. In this case, each subframe includes 14 time domain symbols. Among 14 symbols of the new subframe type 1, there may be 12 symbols for downlink transmission, only one symbol for a guard period (GP), and only one symbol for uplink transmission. Among 14 symbols of the new subframe type 2, there may be only one symbol for downlink transmission, only one symbol for a GP, and 12 symbols for uplink transmission.

In the frame structure based on the short subframe, a subframe of the new subframe type 1 is mainly used for downlink transmission, and may be referred to as a first subframe; and a subframe of the new subframe type 2 is mainly used for uplink transmission, and may be referred to as a second subframe.

In the frame structure based on the short subframe, a frame may include only the first subframe and the second subframe, and may further include a downlink subframe and an uplink subframe. All symbols in the uplink subframe are used for uplink transmission, and all symbols in the downlink subframe are used for downlink transmission.

In the frame structure based on the short subframe, the length of each subframe is shortened, and therefore the service delay is reduced. However, since a subframe structure changes, a structure of a radio frame including various subframes also changes. Therefore, an LTE system based on a new subframe structure cannot use an existing HARQ-ACK feedback mechanism to send an HARQ-ACK. To ensure, in a case of a short subframe, that an HARQ-ACK feedback mechanism can ensure that a system can provide a service having a low service delay requirement and ensure a coverage area, the following embodiments of the present invention provide an HARQ-ACK transmission method and an apparatus, to resolve the foregoing problem.

FIG. 5 is a flowchart of Embodiment 1 of a hybrid automatic repeat request-acknowledgment transmission method according to an embodiment of the present invention. As shown in FIG. 5, the method in this embodiment includes the following steps.

Step S501. User equipment receives, on a first serving cell in a subframe n-k, a PDSCH or a downlink control channel indicating downlink SPS release, where the first serving cell is a serving cell of the user equipment.

Specifically, the first serving cell is the serving cell of the user equipment. A duplex mode of the first serving cell may be TDD, but the duplex mode of the first serving cell is not limited thereto. That user equipment receives, on a first serving cell in a subframe n-k, a PDSCH transmission or a downlink control channel indicating downlink semi-persistent scheduling (SPS) release may be that the user equipment receives, in the subframe n-k, the PDSCH transmission or the downlink control channel indicating downlink SPS release, where the PDSCH transmission or the downlink control channel indicating downlink SPS release is carried by the first serving cell; or may be that the user equipment receives, in the subframe n-k, the PDSCH or the downlink control channel indicating downlink SPS release, where the PDSCH or the downlink control channel indicating downlink SPS release is transmitted on the first serving cell.

The downlink control channel in all embodiments of the present invention is a physical downlink control channel (PDCCH) or an enhanced physical downlink control channel (EPDCCH).

The serving cell of the user equipment may refer to a serving cell configured by a network-side device for the user equipment, or may refer to a serving cell serving the user equipment, or may refer to a serving cell accessed by the user equipment. The serving cell in this embodiment of the present invention may also be referred to as a component carrier. In this embodiment of the present invention, the first serving cell may be a primary serving cell of the user equipment.

Step S502. The user equipment sends, in a subframe n, an HARQ-ACK corresponding to the PDSCH or the downlink control channel that is of the first serving cell and that is in the subframe n-k, where n is an integer, k is a positive integer, k belongs to a set K, the set K is determined according to a configured HARQ-ACK timing, and the configured HARQ-ACK timing includes a first HARQ-ACK timing or a second HARQ-ACK timing.

Specifically, after receiving, on the first serving cell in the subframe n-k, the PDSCH or the downlink control channel indicating downlink SPS release, the user equipment needs to feed back the HARQ-ACK corresponding to the received PDSCH or the received downlink control channel indicating downlink SPS release. In this embodiment, the user equipment sends, in the subframe n, the HARQ-ACK corresponding to the PDSCH or the downlink control channel that is of the first serving cell and that is in the subframe n-k, where n is an integer, k is a positive integer, k belongs to the set K, the set K is determined according to the configured HARQ-ACK timing, and the configured HARQ-ACK timing includes the first HARQ-ACK timing or the second HARQ-ACK timing. The configured HARQ-ACK timing refers to an HARQ-ACK timing configured by a higher layer. In this embodiment of the present invention, that the configured HARQ-ACK timing includes the first HARQ-ACK timing or the second HARQ-ACK timing may refer to that the higher layer configures an HARQ-ACK timing of the first serving cell as the first HARQ-ACK timing or the higher layer configures an HARQ-ACK timing of the first serving cell as the second HARQ-ACK timing. It should be noted that the HARQ-ACK timing, described in this embodiment of the present invention, of the first serving cell is described from a perspective of the user equipment, that is, an HARQ-ACK timing may be different for different user equipments. For same user equipment, the configured HARQ-ACK timing may be the first HARQ-ACK timing within a period of time, that is, the HARQ-ACK timing that is of the first serving cell and that is configured by the higher layer for the user equipment is the first HARQ-ACK timing; and the configured HARQ-ACK timing is the second HARQ-ACK timing within another period of time, that is, the HARQ-ACK timing that is of the first serving cell and that is configured by the higher layer for the user equipment is the second HARQ-ACK timing. When switching between the first HARQ-ACK timing and the second HARQ-ACK timing is required, HARQ-ACK timing reconfiguration may be performed by using higher layer signaling.

The HARQ-ACK corresponding to the first serving cell in the subframe n-k may be the HARQ-ACK corresponding to the PDSCH transmission or the downlink control channel indicating downlink SPS release that is received by the user equipment on the first serving cell in the subframe n-k in step S501. When no PDSCH transmission or no downlink control channel indicating SPS release is received on the first serving cell in a subframe of the subframe n-k, an HARQ-ACK corresponding to the first serving cell in the subframe in which no PDSCH transmission or no downlink control channel indicating downlink SPS release is received on the first serving cell may be discontinuous transmission (DTX) or a negative acknowledgment. When the set K in step S501 includes multiple elements, HARQ-ACKs of the first serving cell in multiple subframes are sent in the subframe n.

In this embodiment of the present invention, the HARQ-ACK timing configured by the higher layer may be obtained directly according to an indication of the higher layer signaling, that is, the higher layer signaling directly indicates whether the HARQ-ACK timing of the first serving cell is the first HARQ-ACK timing or the second HARQ-ACK timing. When the higher layer signaling indicates that the HARQ-ACK timing of the first serving cell is the second HARQ-ACK timing, the user equipment may further determine the set K according to a reference uplink-downlink configuration of the first serving cell. The reference uplink-downlink configuration of the first serving cell may be an uplink-downlink configuration of the first serving cell. The uplink-downlink configuration of the first serving cell defines distribution of a first subframe, a second subframe, a downlink subframe, and an uplink subframe in a radio frame for the first serving cell, for example, defines a quantity, locations, and the like of these several types of subframes. It should be noted that, in a frame structure based on a short subframe, only the first subframe and the second subframe may be included. In this case, if S1 is used to represent the first subframe and S2 is used to represent the second subframe, the uplink-downlink configuration of the first serving cell may include several types in Table 3.

In addition to the seven types of uplink-downlink configurations shown in Table 3, the uplink-downlink configuration of the first serving cell may be another uplink-downlink configuration, for example, may be an uplink-downlink configuration in which there are only first subframes or second subframes in a radio frame. Alternatively, the reference uplink-downlink configuration of the first serving cell may be different from an uplink-downlink configuration of the first serving cell. For example, the uplink-downlink configuration of the first serving cell is a configuration 0, but the reference uplink-downlink configuration of the first serving cell may be an uplink-downlink configuration 2.

Alternatively, the HARQ-ACK timing configured by the higher layer may be obtained according to a reference uplink-downlink configuration configured by the higher layer, that is, the user equipment determines the HARQ-ACK timing of the first serving cell according to the reference uplink-downlink configuration configured by using the higher layer signaling. For example, when the configured reference uplink-downlink configuration is an uplink-downlink configuration other than uplink-downlink configurations 0 to 6, for example, when the reference uplink-downlink configuration configured by the higher layer is an uplink-downlink configuration 7, the HARQ-ACK timing configured by the higher layer may be the first HARQ-ACK timing. When the reference uplink-downlink configuration configured by the higher layer is one of uplink-downlink configurations 0 to 6, the HARQ-ACK timing configured by the higher layer is the second HARQ-ACK timing. When the configured HARQ-ACK timing is the second HARQ-ACK timing, the set K needs to be further determined according to the configured reference uplink-downlink configuration, and in this case, the set K includes at least one element. When the configured HARQ-ACK timing is the second HARQ-ACK timing, a subframe in which an HARQ-ACK of a second serving cell is fed back is only a second subframe or an uplink subframe.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | S1 | S1 | S2 | S2 | S2 | S1 | S1 | S2 | S2 | S2 |
| 1 | S1 | S1 | S2 | S2 | S1 | S1 | S1 | S2 | S2 | S1 |
| 2 | S1 | S1 | S2 | S1 | S1 | S1 | S1 | S2 | S1 | S1 |
| 3 | S1 | S1 | S2 | S2 | S2 | S1 | S1 | S1 | S1 | S1 |
| 4 | S1 | S1 | S2 | S2 | S1 | S1 | S1 | S1 | S1 | S1 |
| 5 | S1 | S1 | S2 | S1 | S1 | S1 | S1 | S1 | S1 | S1 |
| 6 | S1 | S1 | S2 | S2 | S2 | S1 | S1 | S1 | S1 | S1 |

When the HARQ-ACK timing configured by the higher layer is the first HARQ-ACK timing, the set K includes only one element. For example, the set K may be {3} or {4}. When the HARQ-ACK timing configured by the higher layer is the first HARQ-ACK timing, a subframe in which the HARQ-ACK of the first serving cell is fed back includes a first subframe, a second subframe, or an uplink subframe.

Determining the set K according to the reference uplink-downlink configuration of the first serving cell may be implemented in the following two manners. This embodiment of the present invention may use either of the two manners.

Manner 1:

When the reference uplink-downlink configuration is the uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is the uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is the uplink-downlink configuration 2, the subframe n corresponds to a subframe 2 or a subframe 7 in a radio frame, and the set K is {8, 7, 4, 6}; when the reference uplink-downlink configuration is the uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is the uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is the uplink-downlink configuration 5, the subframe n corresponds to a subframe 2 in a radio frame, and the set K is {13, 12, 9, 8, 7, 5, 4, 11, 6}; or when the reference uplink-downlink configuration is the uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

Manner 2:

The user equipment determines the set K according to the reference uplink-downlink configuration of the first serving cell and an association set table. The association set table is shown in Table 4. Table 4 provides an association set K, in a case of each reference uplink-downlink configuration of the first serving cell, corresponding to each subframe n in which an HARQ-ACK is fed back.

It should be noted that, in this embodiment of the present invention, a subframe number refers to a number of a subframe in multiple radio frames, and may be obtained in the following manner: subframes in multiple radio frames are chronologically numbered from 0 in a monotonically increasing manner, that is, if a number of the last subframe of a current radio frame is ń, a number of the first subframe of a next radio frame is ń+1. In the multiple radio frames, each subframe also has a subframe sequence number in a radio frame in which the subframe exists, that is, the subframe sequence number is a subframe sequence number of the subframe in a radio frame. For example, for a subframe 2 in a radio frame, 2 is a subframe sequence number or a subframe number of the subframe in the radio frame.

TABLE 4

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 4-continued

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In this embodiment of the present invention, when the set K includes multiple elements, the subframe n-k may refer to all subframes corresponding to the set K. For example, if the set K is $\{k_0, k_1, \ldots, k_{M-1}\}$, the subframe n-k may refer to M subframes, that is, a subframe $n-k_0$, a subframe $n-k_1, \ldots$, a subframe $n-k_{M-1}$. In this case, that user equipment receives, on a first serving cell in a subframe n-k, a PDSCH transmission or a downlink control channel indicating downlink SPS release in step S501 may also refer to that the user equipment receives, on the first serving cell in the subframe $n-k_0$, the subframe $n-k_1, \ldots$, the subframe $n-k_{M-2}$, or the subframe $n-k_{M-1}$, the PDSCH transmission or the downlink control channel indicating downlink SPS release.

The user equipment receives, on the first serving cell in the subframe n-k, the PDSCH transmission or the downlink control channel indicating downlink SPS release. According to the set K, the subframe n-k may include one subframe or multiple subframes. When multiple subframes are included, in this embodiment, the user equipment may first receive, on the first serving cell in the multiple subframes, PDSCH transmissions or downlink control channels indicating downlink SPS release, and then perform step S502 to send, in the subframe n, HARQ-ACK responses corresponding to the PDSCHs or the downlink control channels that are of the first serving cell and that are in these subframes. According to the set K, the user equipment may determine that HARQ-ACKs in which subframes need to be fed back in each subframe in which an HARQ-ACK can be transmitted, or learn in which subframe an HARQ-ACK response of a PDSCH transmission or a downlink control channel indicating downlink SPS release that is received in a subframe should be fed back.

For example, if the reference uplink-downlink configuration of the first serving cell is the configuration 2, HARQ-ACKs in a subframe n-8, a subframe n-7, a subframe n-6, and a subframe n-4 are sent in the subframe n in step S502. Specifically, if the subframe n corresponds to a subframe 2 or a subframe 7 in a radio frame, and when the subframe n corresponds to a subframe 2 in a radio frame, an HARQ-ACK in a subframe 4, a downlink subframe 5, a subframe 6, or a subframe 8 in a radio frame is fed back in the subframe n; when the subframe n corresponds to a subframe 7 in a radio frame, an HARQ-ACK in a subframe 0, a subframe 1, a subframe 3, or a subframe 9 in a radio frame is fed back in the subframe n. The radio frame described herein is not used to limit that the mentioned subframes are in a same radio frame, and is used to limit a subframe sequence number of the mentioned subframe in a radio frame.

Figure 6:
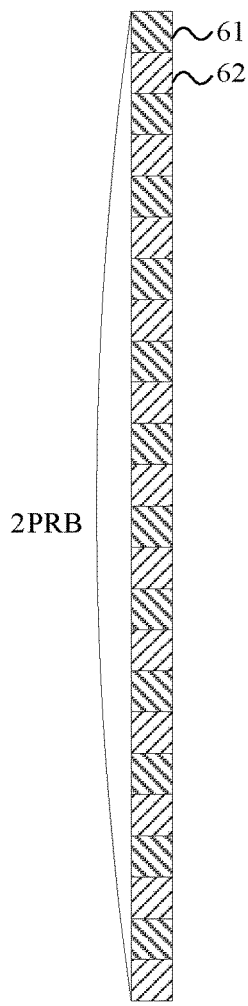
FIG. 6 is a schematic diagram of a PUCCH structure according to an embodiment of the present invention.

When the HARQ-ACK timing configured by the higher layer in step S501 is the first HARQ-ACK timing, the subframe n in this step includes the first subframe, the second subframe, or the uplink subframe. In this case, an HARQ-ACK in only one subframe needs to be fed back in the subframe n. In this case, when the HARQ-ACK is fed back on a physical uplink control channel (PUCCH), a time domain of the PUCCH channel corresponds to only one symbol. A PUCCH structure with the symbol may be shown in FIG. 6. FIG. 6 is a schematic diagram of a PUCCH structure according to an embodiment of the present invention. A PUCCH in FIG. 6 includes one symbol in a time domain and two physical resource blocks (PRB) in a frequency domain. For the two PRBs in the frequency domain, resource elements (RE) for transmitting uplink control information and REs for transmitting reference signals (Reference Signal, RS) are alternately placed (which may also be referred to as comb replacement). In FIG. 6, each RE 61 is used to transmit an RS, and each RE 62 is used to transmit data. The PUCCH structure may be used to transmit a 1-bit HARQ-ACK or a 2-bit HARQ-ACK. The 1-bit HARQ-ACK or the 2-bit HARQ-ACK is modulated into a modulation symbol (for example, the 1-bit HARQ-ACK is modulated into a binary phase shift keying (BPSK) modulation symbol, and the 2-bit HARQ-ACK is modulated into a quadrature phase shift keying (QPSK) modulation symbol). The modulation symbol is multiplied by a 12-length Zadoff-Chu (ZC) sequence and then mapped onto 12 REs for transmission. The 12 REs are used for transmitting the uplink control information. It should be noted that an application of the PUCCH structure shown in FIG. 6 may not depend on step S501 and step S502 in this embodiment. That is, the PUCCH structure may be applied to HARQ-ACK feedback in a system for which a short subframe structure is used. However, an HARQ-ACK timing may not accord with the HARQ-ACK timing defined in step S501 and step S502 in this embodiment of the present invention.

When the first HARQ-ACK timing is used to feed back the HARQ-ACK, the HARQ-ACK can be fed back in time, so that a delay is reduced and the system for which the short subframe structure is used can provide a low-delay service. However, when the first HARQ-ACK timing is used, the HARQ-ACK needs to be fed back in a first subframe. It may be seen from FIG. 3 that a time domain of a first subframe includes only one uplink symbol (which may be an SC-FDMA symbol). Therefore, only the PUCCH structure shown in FIG. 6 can be used to feed back the HARQ-ACK, that is, the HARQ-ACK can be fed back on only one symbol. If the user equipment is at a cell edge, PUCCH performance of this structure may not meet a performance objective, and therefore PUCCH coverage of the system cannot be ensured.

Figure 7:
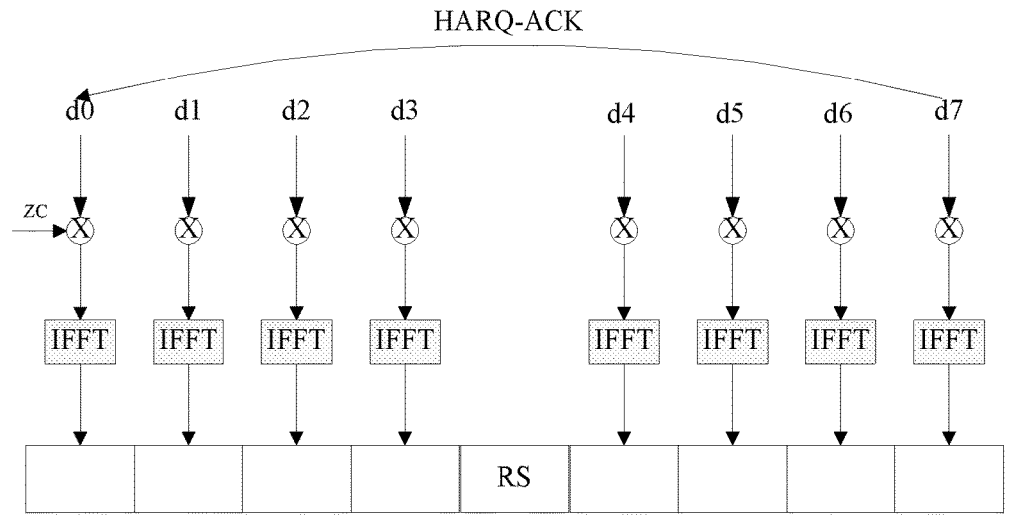
FIG. 7 is a schematic diagram of another PUCCH structure according to an embodiment of the present invention.
Figure 8:
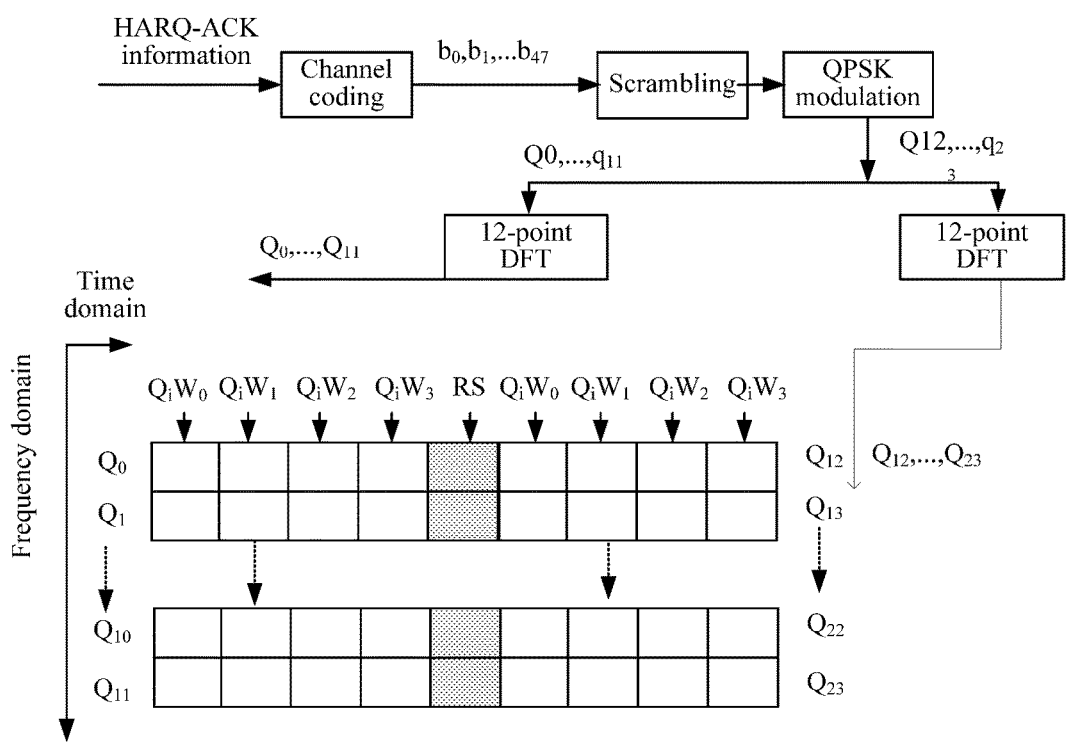
FIG. 8 is a schematic diagram of still another PUCCH structure according to an embodiment of the present invention.
Figure 9:
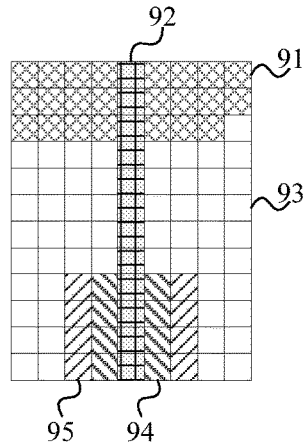
FIG. 9 is a schematic diagram of UCI mapping on a PUSCH according to an embodiment of the present invention.

When the HARQ-ACK timing configured by the higher layer in step S501 is the second HARQ-ACK timing, the HARQ-ACK is fed back only in the second frame or the uplink subframe. For the second subframe, at most nine symbols may be included in a time domain. Therefore, a PUCCH channel structure shown in FIG. 7 or a PUCCH channel structure shown in FIG. 8 may be used to feed back the HARQ-ACK; or the HARQ-ACK may be fed back on a PUSCH, as shown in FIG. 9. In this case, the HARQ-ACK can be fed back on multiple time-domain symbols. This can improve HARQ-ACK feedback performance, thereby ensuring HARQ-ACK coverage. FIG. 7 is a schematic diagram of another PUCCH structure according to an embodiment of the present invention. FIG. 8 is a schematic diagram of still another PUCCH structure according to an embodiment of the present invention. FIG. 9 is a schematic diagram of UCI mapping on a PUSCH according to an embodiment of the present invention.

In the PUCCH channel structure shown in FIG. 7, an HARQ-ACK is modulated into eight QPSK modulation symbols after having undergone channel coding. Each QPSK modulation symbol is mapped onto one time-domain symbol, and each time-domain symbol is multiplied by a ZC sequence and then mapped onto one symbol after having undergone Inverse Fast Fourier Transform (IFFT) processing. In the PUCCH channel structure shown in FIG. 8, 48 coded bits (b0, b1, . . . b47) are obtained after channel coding is performed on HARQ-ACK information. The 48 coded bits (b0, b1, . . . b47) are modulated into 24 QPSK modulation symbols (q0, q1, . . . q23). (Q0, Q1, . . . Q11) obtained after Discrete Fourier Transform (Discrete Fourier Transform, DFT) of the first 12 QPSK modulation symbols (q0, q1, . . . q11) are mapped onto the third time-domain symbol of a subframe, and then are mapped onto the next three time-domain symbols by means of time-domain spreading. (Q12, Q1, . . . Q23) obtained after DFT transform of the last 12 QPSK modulation symbols (q12, q1, . . . q23) of the 24 modulation symbols are mapped onto the seventh time-domain symbols of the subframe, and then are mapped onto the next three time-domain symbols by means of time-domain spreading. If a sounding reference signal (SRS) needs to be sent on the last time-domain symbol of the subframe, for the PUCCH channel structure shown in FIG. 7, the last time-domain symbol may be punctured, that is, only 12 coded bits are transmitted after channel coding; for the PUCCH channel structure shown in FIG. 8, the last time-domain symbol may also be punctured, and the last 12 modulation symbols are mapped onto the eighth to the tenth time-domain symbols by using 3-length time-domain spreading code. In FIG. 8, $w_i$ is time-domain spreading code. It should be noted that applications of the PUCCH structures shown in FIG. 7 and FIG. 8 may not depend on step S501 and step S502 in this embodiment. The two PUCCH structures may be applied to HARQ-ACK feedback in a system for which a short subframe structure is used. However, an HARQ-ACK timing may not accord with the HARQ-ACK timing defined in step S501 and step S502 in this embodiment of the present invention. The two PUCCH structures may also be applied to uplink control information feedback in another scenario. In addition, an application of a structure in which uplink control information (UCI) is fed back on a PUSCH in FIG. 9 may also not depend on step S501 and step S502 in this embodiment, and the structure may be applied to UCI transmission on a PUSCH in another scenario. In FIG. 9, channel state information (CSI) is transmitted on an RE 91, an RS is transmitted on an RE 92, data is transmitted on an RE 93, an RE 94 is null, and a rank (RI) is transmitted on an RE 95.

According to the hybrid automatic repeat request-acknowledgment transmission method provided in this embodiment, an HARQ-ACK timing is configured by using a higher layer, and a first HARQ-ACK timing and a second HARQ-ACK timing are provided. For a cell center user, the first HARQ-ACK timing may be configured, so that a delay is reduced and a system can provide a low-delay service. For a cell edge user, the second HARQ-ACK timing may be configured, so that HARQ-ACK performance is ensured, that is, coverage of the system is ensured. Therefore, when a short subframe structure is used, the system can provide a service having a low service delay requirement, and large enough coverage of a new subframe structure can be ensured.

It should be noted that, in addition to being applied to a frame structure based on a short subframe, all embodiments of the present invention may be applied to another scenario. For example, in a frame structure, a length of each subframe is 1 ms, but a subframe structure similar to a first subframe and a second subframe is introduced in the frame structure, and therefore the frame structure may also be applied to the method described in the embodiments of the present invention.

Figure 10:
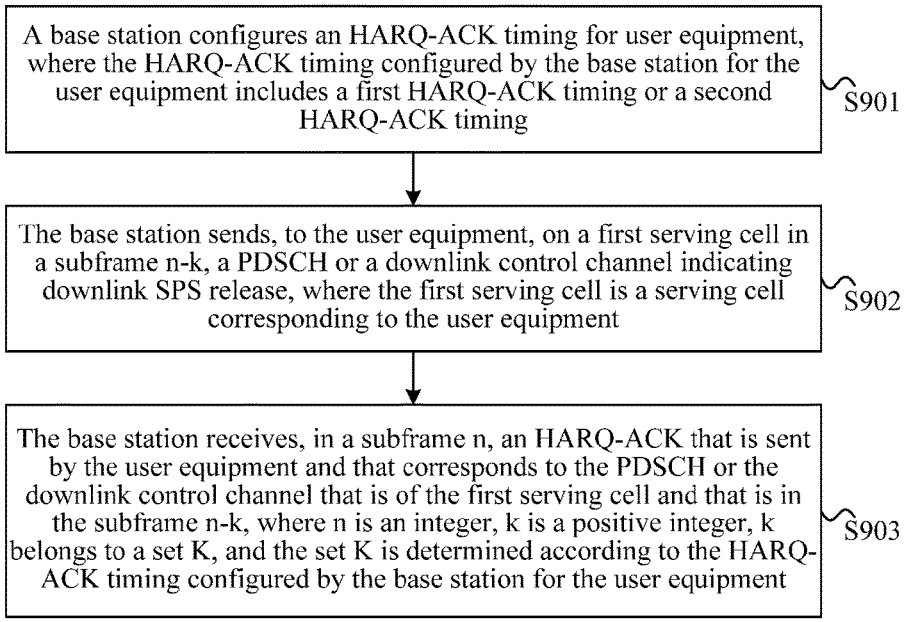
FIG. 10 is a schematic flowchart of Embodiment 2 of a hybrid automatic repeat request-acknowledgment transmission method according to an embodiment of the present invention.

FIG. 10 is a schematic flowchart of Embodiment 2 of a hybrid automatic repeat request-acknowledgment transmission method according to an embodiment of the present invention. As shown in FIG. 10, the method in this embodiment includes the following steps.

Step S901. A base station configures an HARQ-ACK timing for user equipment, where the HARQ-ACK timing configured by the base station for the user equipment includes a first HARQ-ACK timing or a second HARQ-ACK timing.

Specifically, in this step, that a base station configures an HARQ-ACK timing for user equipment may also be referred to as that the base station configures the HARQ-ACK timing for the user equipment, and may be implemented in the following two manners.

Manner 1: The base station sends higher layer signaling to the user equipment. The higher layer signaling indicates that an HARQ-ACK timing of the first serving cell is the first HARQ-ACK timing or the higher layer signaling indicates that HARQ-ACK timing of the first serving cell is the second HARQ-ACK timing.

When the higher layer signaling indicates that the HARQ-ACK timing of the first serving cell is the second HARQ-ACK timing, the user equipment may further determine the set K according to a reference uplink-downlink configuration of the first serving cell. The reference uplink-downlink configuration of the first serving cell may be an uplink-downlink configuration of the first serving cell. The uplink-downlink configuration of the first serving cell defines distribution of a first subframe, a second subframe, a downlink subframe, and an uplink subframe in a radio frame for the first serving cell, for example, defines a quantity, locations, and the like of several types of subframes.

Manner 2: The base station configures a reference uplink-downlink configuration of a first serving cell for the user equipment, and an HARQ-ACK timing of the first serving cell is determined according to the reference uplink-downlink configuration.

In manner 2, the base station indicates the reference uplink-downlink configuration of the first serving cell by using higher layer signaling, and the user equipment determines the HARQ-ACK timing of the first serving cell according to the reference uplink-downlink configuration configured by a higher layer. For example, when the configured reference uplink-downlink configuration is an uplink-downlink configuration other than uplink-downlink configurations 0 to 6, for example, when the reference uplink-downlink configuration configured by the higher layer is an uplink-downlink configuration 7, the HARQ-ACK timing configured by the higher layer may be the first HARQ-ACK timing. When the reference uplink-downlink configuration configured by the higher layer is one of uplink-downlink configurations 0 to 6, the HARQ-ACK timing configured by the higher layer is the second HARQ-ACK timing. When the configured HARQ-ACK timing is the second HARQ-ACK timing, a set K needs to be further determined according to the configured reference uplink-downlink configuration. In this case, the set K includes at least one element. When the configured HARQ-ACK timing is the second HARQ-ACK timing, a subframe in which an HARQ-ACK of a second serving cell is received is only a second subframe or an uplink subframe.

In manner 2, the base station may further determine the HARQ-ACK timing of the first serving cell for the user equipment according to the reference uplink-downlink configuration that is of the first serving cell and that is notified to the user equipment, so as to receive an HARQ-ACK that is of the first serving cell and that is fed back by the user equipment.

It should be noted that when configuring the HARQ-ACK timing for the user equipment, the base station may configure different HARQ-ACK timings for different user equipments according to related parameters of the user equipments. For example, the first HARQ-ACK timing is configured for a cell center user or user equipment with relatively good channel quality, and the second HARQ-ACK timing is configured for a cell edge user or user equipment with relatively poor channel quality. Before this, the base station may measure the related parameters of the user equipments, or receive the related parameters actively reported by the user equipments.

Step S902. The base station sends, to the user equipment, on a first serving cell in a subframe n-k, a PDSCH or a downlink control channel indicating downlink SPS release, where the first serving cell is a serving cell of the user equipment.

Specifically, the first serving cell is the serving cell of the user equipment. A duplex mode of the first serving cell may be TDD, but the duplex mode of the first serving cell is not limited thereto. That the base station sends, to the user equipment, on a first serving cell in a subframe n-k, a PDSCH transmission or a downlink control channel indicating downlink SPS release may be that the base station sends, to the user equipment in the subframe n-k, the PDSCH transmission or the downlink control channel indicating downlink SPS release, where the PDSCH transmission or the downlink control channel indicating downlink SPS release is carried on the first serving cell.

The serving cell of the user equipment may refer to a serving cell configured by a network-side device for the user equipment, or may refer to a serving cell serving the user equipment, or may refer to a serving cell accessed by the user equipment. The serving cell (serving cell) in this embodiment of the present invention may also be referred to as a component carrier (component carrier). In this embodiment of the present invention, the first serving cell may be a primary serving cell (Primary serving cell) of the user equipment.

Step S903. The base station receives, in a subframe n, an HARQ-ACK that is sent by the user equipment and that corresponds to the PDSCH or the downlink control channel that is of the first serving cell and that is in the subframe n-k, where n is an integer, k is a positive integer, k belongs to a set K, and the set K is determined according to the HARQ-ACK timing configured by the base station for the user equipment.

Specifically, after sending, to the user equipment, on the first serving cell in the subframe n-k, the PDSCH or the downlink control channel indicating downlink SPS release, the base station needs to receive the HARQ-ACK that is fed back by the user equipment and that is in the subframe n-k. In this embodiment, the user equipment receives, in the subframe n, the HARQ-ACK that is fed back by the user equipment and that corresponds to the PDSCH or the downlink control channel that is of the first serving cell and that is in the subframe n-k, where k is a positive integer, k belongs to the set K, and the set K may be determined according to the HARQ-ACK timing of the first serving cell.

The HARQ-ACK corresponding to the PDSCH or the downlink control channel that is of the first serving cell and that is in the subframe n-k may be the HARQ-ACK corresponding to the PDSCH transmission or the downlink control channel indicating downlink SPS release. The PDSCH transmission or the downlink control channel indicating downlink SPS release is sent, by the base station to the user equipment, on the first serving cell in the subframe n-k in step S902. When no PDSCH transmission or no downlink control channel indicating downlink SPS release is sent, to the user equipment, on the first serving cell in a downlink subframe of the subframe n-k, the base station may estimate that an HARQ-ACK corresponding to the first serving cell in the downlink subframe in which no PDSCH transmission or no downlink control channel indicating downlink SPS release is sent, to the user equipment, on the first serving cell may be DTX or a negative acknowledgment. When the set K in step S501 includes multiple elements, HARQ-ACKs of the first serving cell in multiple subframes are received in the subframe n.

Determining the set K according to the reference uplink-downlink configuration of the first serving cell may be implemented in the following two manners. This embodiment of the present invention may use either of the two manners.

Manner 1:

When the reference uplink-downlink configuration is the uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is the uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is the uplink-downlink configuration 2, the subframe n corresponds to a subframe 2 or a subframe 7 in a radio frame, and the set K is {8, 7, 4, 6}; when the reference uplink-downlink configuration is the uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is the uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is the uplink-downlink configuration 5, the subframe n corresponds to a subframe 2 in a radio frame, and the set K is {13, 12, 9, 8, 7, 5, 4, 11, 6}; or when the reference uplink-downlink configuration is the uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

Manner 2:

The base station determines the set K according to the reference uplink-downlink configuration of the first serving cell and an association set table. The association set table is shown in Table 4. Table 4 provides an association set K, in a case of each reference uplink-downlink configuration of the first serving cell, corresponding to each subframe n in which an HARQ-ACK is fed back.

In this embodiment of the present invention, when the set K includes multiple elements, the subframe n-k may refer to all subframes corresponding to the set K. For example, if the set K is $\{k_0, k_1, \ldots, k_{M-1}\}$, the subframe n-k may refer to M subframes, that is, a subframe $n-k_0$, a subframe $n-k_1, \ldots,$ a subframe $n-k_{M-1}$. In this case, that the base station sends, to the user equipment, on a first serving cell in a subframe n-k, a PDSCH transmission or a downlink control channel indicating downlink SPS release in step 901 may also refer to that the base station sends, to the user equipment, on the first serving cell in the subframe $n-k_0$, the subframe $n-k_1, \ldots,$ the subframe $n-k_{M-2}$, and the subframe $n-k_{M-1}$, the PDSCH transmission or the downlink control channel indicating downlink SPS release. A subframe $n-k_1$ has a similar understanding, where k1 belongs to a set K1. Details are not described herein.

The base station sends, to the user equipment, on the first serving cell in the subframe n-k, the PDSCH transmission or the downlink control channel indicating downlink SPS release. According to the set K, the subframe n-k may include one subframe or multiple subframes. When multiple subframes are included, in this embodiment, the base station may first send, to the user equipment, on the first serving cell in the multiple subframes, the PDSCH transmission or the downlink control channel indicating downlink SPS release, and then perform step S903 to receive, in the subframe n, HARQ-ACK responses corresponding to the first serving cell in these subframes. According to the set K, the base station may determine that HARQ-ACKs in which subframes need to be fed back in each subframe in which an HARQ-ACK can be transmitted, or learn in which subframe an HARQ-ACK of a PDSCH transmission or a downlink control channel indicating downlink SPS release that is transmitted to the user equipment in a subframe should be received. For example, if the reference uplink-downlink configuration of the first serving cell is the configuration 2, an HARQ-ACK response in a subframe n-8, a subframe n-7, a subframe n-6, or a subframe n-4 is received in the subframe n in step S902. Specifically, if the subframe n corresponds to a subframe 2 or a subframe 7 in a radio frame, and when the subframe n corresponds to a subframe 2 in a radio frame, an HARQ-ACK in a subframe 4, a downlink subframe 5, a subframe 6, or a subframe 8 in a radio frame is received in the subframe n; when the subframe n corresponds to a subframe 7 in a radio frame, an HARQ-ACK in a subframe 0, a subframe 1, a subframe 3, or a subframe 9 in a radio frame is received in the subframe n. The radio frame described herein is not used to limit that the mentioned subframes are in a same radio frame, and is used to limit a subframe sequence number of the mentioned subframe in a radio frame.

In step S903, when the HARQ-ACK timing in step S901 is the first HARQ-ACK timing, the subframe n in this step includes the first subframe, the second subframe, or the uplink subframe. In this case, an HARQ-ACK in only one subframe needs to be received in the subframe n. In this case, the base station may receive the HARQ-ACK according to a PUCCH channel structure shown in FIG. 6. The PUCCH structure is described above, and details are not described herein.

When the first HARQ-ACK timing is used, the user equipment can feed back the HARQ-ACK in time, so that a system for which the short subframe structure is used can provide a low-delay service.

In step S903, when the HARQ-ACK timing configured by the higher layer is the second HARQ-ACK timing, the HARQ-ACK is fed back only in the second frame or the uplink subframe. In this case, the base station may receive, based on a PUCCH channel structure shown in FIG. 7, the HARQ-ACK sent by the user equipment. Alternatively, the base station may receive, based on a PUCCH channel structure shown in FIG. 8, the HARQ-ACK sent by the user equipment. It should be noted that the user equipment and the base station need to be based on a same PUCCH channel structure. If a user equipment side feeds back the HARQ-ACK on a PUSCH, the base station may receive the HARQ-ACK according to a structure shown in FIG. 9. The PUCCH channel structure shown in FIG. 7, the PUCCH channel structure shown in FIG. 8, and a mechanism, shown in FIG. 9, for feeding back UCI on a PUSCH are described above, and details are not described herein.

According to the hybrid automatic repeat request-acknowledgment transmission method provided in this embodiment, a base station configures a HARQ-ACK timing by using a higher layer, and a first HARQ-ACK timing and a second HARQ-ACK timing are provided. For a cell center user, the first HARQ-ACK timing may be configured, so that a delay is reduced and a system can provide a low-delay service. For a cell edge user, the second HARQ-ACK timing may be configured, so that HARQ-ACK performance is ensured, that is, coverage of the system is ensured. Therefore, when a short subframe structure is used, the system can provide a service having a low service delay requirement, and large enough coverage of a new subframe structure can be ensured.

Figure 11:
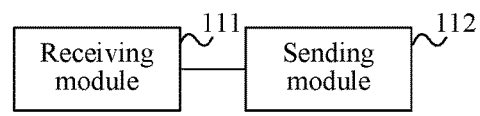
FIG. 11 is a schematic structural diagram of Embodiment 1 of user equipment according to an embodiment of the present invention.

FIG. 11 is a schematic structural diagram of Embodiment 1 of user equipment according to an embodiment of the present invention. As shown in FIG. 11, the user equipment in this embodiment includes: a receiving module 111, configured to receive, on a first serving cell in a subframe n-k, a PDSCH or a downlink control channel indicating downlink SPS release, where the first serving cell is a serving cell of the user equipment; and a sending module 112, configured to send, in a subframe n, an HARQ-ACK corresponding to the PDSCH or the downlink control channel that is of the first serving cell and that is in the subframe n-k, where n is an integer, k is a positive integer, k belongs to a set K, the set K is determined according to a configured HARQ-ACK timing, and the configured HARQ-ACK timing includes a first HARQ-ACK timing or a second HARQ-ACK timing.

The user equipment in this embodiment is configured to execute the technical solution of the method embodiment shown in FIG. 5. Implementation principles and technical effects thereof are similar, and details are not described herein.

Further, in the embodiment shown in FIG. 11, when the configured HARQ-ACK timing is the first HARQ-ACK timing, the set K includes only one element, and the subframe n is a first subframe, a second subframe, or an uplink subframe; or when the configured HARQ-ACK timing is the second HARQ-ACK timing, the set K includes at least one element, and the subframe n is a second subframe or an uplink subframe.

Further, in the embodiment shown in FIG. 11, the set K is {3} or {4} when the configured HARQ-ACK timing is the first HARQ-ACK timing.

Further, in the embodiment shown in FIG. 11, the set K is determined according to a reference uplink-downlink configuration of the first serving cell when the configured HARQ-ACK timing is the second HARQ-ACK timing.

Further, in the embodiment shown in FIG. 11, that the set K is determined according to a reference uplink-downlink configuration of the first serving cell when the configured HARQ-ACK timing is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is an uplink-downlink configuration 2, the subframe n corresponds to a subframe 2 or a subframe 7 in a radio frame, and the set K is {8, 7, 4, 6}; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

Further, in the embodiment shown in FIG. 11, the reference uplink-downlink configuration is an uplink-downlink configuration of the first serving cell, and the uplink-downlink configuration of the first serving cell indicates distribution of a first subframe, a second subframe, a downlink subframe, and an uplink subframe in a radio frame.

Figure 12:
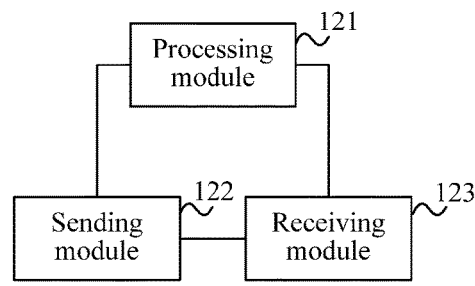
FIG. 12 is a schematic structural diagram of Embodiment 1 of a base station according to an embodiment of the present invention.

FIG. 12 is a schematic structural diagram of Embodiment 1 of a base station according to an embodiment of the present invention. As shown in FIG. 12, the base station in this embodiment includes: a processing module 121, configured to configure an HARQ-ACK timing for user equipment, where the HARQ-ACK timing configured by the processing module 121 for the user equipment includes a first HARQ-ACK timing or a second HARQ-ACK timing; a sending module 122, configured to send, to the user equipment, on a first serving cell in a subframe n-k, a PDSCH or a downlink control channel indicating downlink SPS release, where the first serving cell is a serving cell of the user equipment; and a receiving module 123, configured to receive, in a subframe n, an HARQ-ACK that is sent by the user equipment and that corresponds to the PDSCH or the downlink control channel that is of the first serving cell and that is in the subframe n-k, where n is an integer, k is a positive integer, k belongs to a set K, and the set K is determined according to the HARQ-ACK timing configured by the processing module 121 for the user equipment.

The base station in this embodiment is configured to execute the technical solution of the method embodiment shown in FIG. 10. Implementation principles and technical effects thereof are similar, and details are not described herein.

Further, in the embodiment shown in FIG. 12, when the HARQ-ACK timing configured by the processing module 121 for the user equipment is the first HARQ-ACK timing, the set K includes only one element, and the subframe n is a first subframe, a second subframe, or an uplink subframe; or when the HARQ-ACK timing configured by the processing module 121 for the user equipment is the second HARQ-ACK timing, the set K includes at least one element, and the subframe n is a second subframe or an uplink subframe.

Further, in the embodiment shown in FIG. 12, the set K is {3} or {4} when the HARQ-ACK timing configured by the processing module 121 for the user equipment is the first HARQ-ACK timing.

Further, in the embodiment shown in FIG. 12, the set K is determined according to a reference uplink-downlink configuration of the first serving cell when the HARQ-ACK timing configured by the processing module 121 for the user equipment is the second HARQ-ACK timing.

Further, in the embodiment shown in FIG. 12, that the set K is determined according to a reference uplink-downlink configuration of the first serving cell when the HARQ-ACK timing configured by the processing module 121 for the user equipment is the second HARQ-ACK timing includes: when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4}; when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4}; when the reference uplink-downlink configuration is an uplink-downlink configuration 2, the subframe n corresponds to a subframe 2 or a subframe 7 in a radio frame, and the set K is {8, 7, 4, 6}; when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4}; when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7}; when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

Further, in the embodiment shown in FIG. 12, the reference uplink-downlink configuration is an uplink-downlink configuration of the first serving cell, and the uplink-downlink configuration of the first serving cell indicates distribution of a first subframe, a second subframe, and an uplink subframe in a radio frame.

Further, in the embodiment shown in FIG. 12, the processing module 121 is specifically configured to configure the reference uplink-downlink configuration of the first serving cell for the user equipment, where the reference uplink-downlink configuration of the first serving cell determines an HARQ-ACK timing of the first serving cell.

It should be noted that the receiving module 111 in this embodiment of the present invention may correspond to a receiver of user equipment, or may correspond to a transceiver of user equipment. The sending module 112 may correspond to a transmitter of user equipment, or may correspond to a transceiver of user equipment. The user equipment may further include a processor. The processor herein may be a central processing unit (CPU), an application-specific integrated circuit (ASIC), or one or more integrated circuits implementing this embodiment of the present invention. The user equipment may further include a memory. The memory is configured to store instruction code. The processor invokes the instruction code in the memory, to control the receiving module 111 and the sending module 112 in this embodiment of the present invention to perform the foregoing operations.

The sending module 122 in this embodiment of the present invention may correspond to a transmitter of a base station, or may correspond to a transceiver of a base station. The receiving module 123 may correspond to a receiver of a base station, or may correspond to a transceiver of a base station. The processing module 121 may correspond to a processor of a base station. The processor herein may be a CPU, an ASIC, or one or more integrated circuits implementing this embodiment of the present invention. The base station may further include a memory. The memory is configured to store instruction code. The processor invokes the instruction code in the memory, to control the sending module 122, the receiving module 123, and the processing module 121 in this embodiment of the present invention to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A method, comprising:
receiving, by user equipment, higher layer signaling, wherein the higher layer signaling instructs the user equipment to use a configured hybrid automatic repeat request-acknowledgment (HARQ-ACK) timing, and the configured HARQ-ACK timing is selected for the user equipment from a first HARQ-ACK timing and a second HARQ-ACK timing according to a location of the user equipment;
receiving, by the user equipment, on a first serving cell in a subframe n-k, a physical downlink shared channel (PDSCH) or a downlink control channel indicating downlink semi-persistent scheduling (SPS) release, wherein the first serving cell is a serving cell of the user equipment; and
sending, by the user equipment in a subframe n, a HARQ-ACK corresponding to the PDSCH or the downlink control channel that is of the first serving cell and that is in the subframe n-k, wherein n is an integer, k is a positive integer, k belongs to a set K, the set K is determined according to the configured HARQ-ACK timing.

2. The method according to claim 1, wherein, when the configured HARQ-ACK timing is the first HARQ-ACK timing, the set K comprises only one element, and the subframe n is a first subframe, a second subframe, or an uplink subframe; or
wherein, when the configured HARQ-ACK timing is the second HARQ-ACK timing, the set K comprises at least one element, and the subframe n is a second subframe or an uplink subframe.

3. The method according to claim 2, wherein the set K is {3} or {4} when the configured HARQ-ACK timing is the first HARQ-ACK timing.

4. The method according to claim 1, wherein the set K is determined according to a reference uplink-downlink configuration of the first serving cell when the configured HARQ-ACK timing is the second HARQ-ACK timing.

5. The method according to claim 4, wherein the set K being determined according to a reference uplink-downlink configuration of the first serving cell when the configured HARQ-ACK timing is the second HARQ-ACK timing comprises:
when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4};
when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4};

when the reference uplink-downlink configuration is an uplink-downlink configuration 2, the subframe n corresponds to a subframe 2 or a subframe 7 in a radio frame, and the set K is {8, 7, 4, 6};

when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4};

when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, ii}, or when the subframe n corresponds to a subframe 3 in a radio frame, the set K is {6, 5, 4, 7};

when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

6. A method, comprising:
sending, by a base station to a user equipment, on a first serving cell in a subframe n-k, a physical downlink shared channel (PDSCH) or a downlink control channel indicating downlink semi-persistent scheduling (SPS) release, wherein the first serving cell is a serving cell of the user equipment; and
receiving, by the base station in a subframe n, a hybrid automatic repeat request-acknowledgment (HARQ-ACK) that is sent by the user equipment and that corresponds to the PDSCH or the downlink control channel that is of the first serving cell and that is in the subframe n-k, wherein n is an integer, k is a positive integer, k belongs to a set K, and the set K is determined according to a HARQ-ACK timing configured by the base station for the user equipment, and the configured HARQ-ACK timing is selected by a base station from a first HARQ-ACK timing and a second HARQ-ACK timing;
wherein when the HARQ-ACK timing configured by the base station for the user equipment is the first HARQ-ACK timing, the set K comprises only one element, and the set K is determined independently of an uplink-downlink configuration of the first serving cell; and
wherein when the HARQ-ACK timing configured by the base station for the user equipment is the second HARQ-ACK timing, the set K is determined according to a reference uplink-downlink configuration of the first serving cell, the reference uplink-downlink configuration of the first serving cell is one of a plurality of default uplink-downlink configurations, and the set K comprises at least one element.

7. The method according to claim 6, wherein the set K is {3} or {4} when the HARQ-ACK timing configured by the base station for the user equipment is the first HARQ-ACK timing.

8. The method according to claim 6, wherein the set K being determined according to a reference uplink-downlink configuration of the first serving cell when the HARQ-ACK timing configured by the base station for the user equipment is the second HARQ-ACK timing comprises:

when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4};

when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4};

when the reference uplink-downlink configuration is an uplink-downlink configuration 2, the subframe n corresponds to a subframe 2 or a subframe 7 in a radio frame, and the set K is {8, 7, 4, 6};

when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4};

when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7};

when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

9. The method according to claim 6, wherein:
when the HARQ-ACK timing configured by the base station for the user equipment is the first HARQ-ACK timing, the subframe n is a first subframe or a second subframe, wherein the first subframe comprises a plurality of first symbols used for downlink communication and a single symbol used for uplink communication, and the second subframe comprises a plurality of second symbols used for uplink communication and a single symbol used for downlink communication; and
when the HARQ-ACK timing configured by the base station for the user equipment is the second HARQ-ACK timing, the subframe n is a second subframe.

10. User equipment, comprising:
a receiver, configured to receive, on a first serving cell in a subframe n-k, a physical downlink shared channel (PDSCH) or a downlink control channel indicating downlink semi-persistent scheduling (SPS) release, wherein the first serving cell is a serving cell of the user equipment; and
a transmitter, configured to send, in a subframe n, a hybrid automatic repeat request-acknowledgment (HARQ-ACK) corresponding to the PDSCH or the downlink control channel that is of the first serving cell and that is in the subframe n-k, wherein n is an integer, k is a positive integer, k belongs to a set K, the set K is determined according to a configured HARQ-ACK timing, and the configured HARQ-ACK timing is selected from a first HARQ-ACK timing and a second HARQ-ACK timing;
wherein when the configured HARQ-ACK timing is the first HARQ-ACK timing, the subframe n is a first subframe or a second subframe, wherein the first subframe comprises a plurality of first symbols used for downlink communication and a single symbol used for uplink communication, and the second subframe comprises a plurality of second symbols used for uplink communication and a single symbol used for downlink communication; and
wherein when the configured HARQ-ACK timing for the user equipment is the second HARQ-ACK timing, the set K is determined according to a reference uplink-downlink configuration of the first serving cell, the reference uplink-downlink configuration of the first serving cell is one of a plurality of default uplink-downlink configurations, and the subframe n is a second subframe.

11. The user equipment according to claim 10, wherein, when the configured HARQ-ACK timing is the first HARQ-ACK timing, the set K comprises only one element; or
wherein, when the configured HARQ-ACK timing is the second HARQ-ACK timing, the set K comprises at least one element.

12. The user equipment according to claim 11, wherein the set K being determined according to a reference uplink-downlink configuration of the first serving cell when the configured HARQ-ACK timing is the second HARQ-ACK timing comprises:
when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4};
when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4};
when the reference uplink-downlink configuration is an uplink-downlink configuration 2, the subframe n corresponds to a subframe 2 or a subframe 7 in a radio frame, and the set K is {8, 7, 4, 6};
when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4};
when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7};
when the reference uplink-downlink configuration is an uplink-downlink configuration 5, the subframe n corresponds to a subframe 2 in a radio frame, and the set K is {13, 12, 9, 8, 7, 5, 4, 11, 6}; or
when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

13. A base station, comprising:
a processor; and
a computer-readable storage medium storing a program to be executed by the processor, the program including instructions for:
configuring a hybrid automatic repeat request-acknowledgment (HARQ-ACK) timing for a user equipment, wherein the HARQ-ACK timing is selected from a first HARQ-ACK timing or a second HARQ-ACK timing, and wherein the HARQ-ACK timing is separately configured by the base station for each user equipment served by the base station according to a location of the respective user equipment in a first serving cell;
a transmitter, configured to send, to the user equipment, on the first serving cell in a subframe n-k, a physical downlink shared channel (PDSCH) or a downlink control channel indicating downlink semi-persistent scheduling (SPS) release, wherein the first serving cell is a serving cell of the user equipment; and
a receiver, configured to receive, in a subframe n, an HARQ-ACK that is sent by the user equipment and that corresponds to the PDSCH or the downlink control channel that is of the first serving cell and that is in the subframe n-k, wherein n is an integer, k is a positive integer, k belongs to a set K, and the set K is determined according to the HARQ-ACK timing configured for the user equipment.

14. The base station according to claim 13, wherein when the HARQ-ACK timing configured for the user equipment is the first HARQ-ACK timing, the set K comprises only one element, and the subframe n is a first subframe, a second subframe, or an uplink subframe; or wherein, when the HARQ-ACK timing configured for the user equipment is the second HARQ-ACK timing, the set K comprises at least one element, and the subframe n is a second subframe or an uplink subframe.

15. The base station according to claim 13, wherein the set K is determined according to a reference uplink-downlink configuration of the first serving cell when the HARQ-ACK timing configured for the user equipment is the second HARQ-ACK timing.

16. The base station according to claim 15, wherein the set K being determined according to a reference uplink-downlink configuration of the first serving cell when the HARQ-ACK timing configured for the user equipment is the second HARQ-ACK timing comprises:

when the reference uplink-downlink configuration is an uplink-downlink configuration 0, the subframe n corresponds to a subframe 2, a subframe 4, a subframe 7 or a subframe 9 in a radio frame; and when the subframe n corresponds to a subframe 2 or a subframe 7 in a radio frame, the set K is {6}, or when the subframe n corresponds to a subframe 4 or a subframe 9 in a radio frame, the set K is {4};

when the reference uplink-downlink configuration is an uplink-downlink configuration 1, the subframe n corresponds to a subframe 2, a subframe 3, a subframe 7 or a subframe 8 in a radio frame; and when the subframe n corresponds to a subframe 2 or a subframe 7 in a radio frame, the set K is {7, 6}, or when the subframe n corresponds to a subframe 3 or a subframe 8 in a radio frame, the set K is {4};

when the reference uplink-downlink configuration is an uplink-downlink configuration 2, the subframe n corresponds to a subframe 2 or a subframe 7 in a radio frame, and the set K is {8, 7, 4, 6};

when the reference uplink-downlink configuration is an uplink-downlink configuration 3, the subframe n corresponds to a subframe 2, a subframe 3 or a subframe 4 in a radio frame; and when the subframe n corresponds to a subframe 2 in a radio frame, the set K is {7, 6, 11}, when the subframe n corresponds to a subframe 3 in a radio frame, the set K is {6, 5}, or when the subframe n corresponds to a subframe 4 in a radio frame, the set K is {5, 4};

when the reference uplink-downlink configuration is an uplink-downlink configuration 4, the subframe n corresponds to a subframe 2 and a subframe 3 in a radio frame; and when the subframe n corresponds to a subframe 2 in a radio frame, the set K is {12, 8, 7, 11}, or when the subframe n corresponds to a subframe 3 in a radio frame, the set K is {6, 5, 4, 7};

when the reference uplink-downlink configuration is an uplink-downlink configuration 5, the subframe n corresponds to a subframe 2 in a radio frame, and the set K is {13, 12, 9, 8, 7, 5, 4, 11, 6}; or when the reference uplink-downlink configuration is an uplink-downlink configuration 6, the subframe n corresponds to a subframe 2, a subframe 3, a subframe 4, a subframe 7 or a subframe 8 in a radio frame; and when the subframe n corresponds to a subframe 2, a subframe 3, a subframe 7 or a subframe 8 in a radio frame, the set K is {7}, or when the subframe n corresponds to a subframe 4 in a radio frame, the set K is {5}.

* * * * *